United States Patent
Lee et al.

(10) Patent No.: US 8,804,692 B2
(45) Date of Patent: Aug. 12, 2014

(54) METHOD OF TRANSMITTING AND RECEIVING DATA IN A WIRELESS COMMUNICATION SYSTEM

(75) Inventors: Dae Won Lee, Anyang-si (KR); Han Byul Seo, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 332 days.

(21) Appl. No.: 13/146,080

(22) PCT Filed: Mar. 12, 2010

(86) PCT No.: PCT/KR2010/001550
§ 371 (c)(1),
(2), (4) Date: Jul. 25, 2011

(87) PCT Pub. No.: WO2010/104354
PCT Pub. Date: Sep. 16, 2010

(65) Prior Publication Data
US 2011/0286415 A1    Nov. 24, 2011

Related U.S. Application Data

(60) Provisional application No. 61/159,806, filed on Mar. 13, 2009.

(51) Int. Cl.
*H04J 3/06* (2006.01)
*H04W 56/00* (2009.01)
*H04L 27/26* (2006.01)

(52) U.S. Cl.
CPC ........ *H04W 56/004* (2013.01); *H04W 56/0055* (2013.01); *H04L 27/2646* (2013.01)
USPC ........................................................ 370/350

(58) Field of Classification Search
CPC .......... H04W 56/0065; H04W 56/004; H04W 56/0055; H04L 27/2646
See application file for complete search history.

(56) References Cited

U.S. PATENT DOCUMENTS

| | | | |
|---|---|---|---|
| 2003/0114114 A1* | 6/2003 | Itoh ................................. | 455/69 |
| 2004/0248527 A1 | 12/2004 | Park et al. | |
| 2005/0073971 A1* | 4/2005 | Mukai ........................... | 370/328 |
| 2005/0286465 A1* | 12/2005 | Zhuang ......................... | 370/329 |
| 2006/0245349 A1* | 11/2006 | Vrcelj et al. ................... | 370/210 |
| 2007/0086406 A1* | 4/2007 | Papasakellariou ............ | 370/343 |
| 2008/0014969 A1* | 1/2008 | Laroia et al. .................. | 455/458 |
| 2011/0249665 A1* | 10/2011 | Seyama et al. ................ | 370/350 |

FOREIGN PATENT DOCUMENTS

| KR | 10-1999-0053236 A | 7/1999 |
|---|---|---|
| KR | 10-0350411 B1 | 8/2002 |

* cited by examiner

*Primary Examiner* — Jae Y Lee
(74) *Attorney, Agent, or Firm* — Birch, Stewart, Kolasch & Birch, LLP

(57) ABSTRACT

A data transmitting method in a wireless communication system is disclosed. In transmitting data by a base station to a user equipment communicating with a plurality of cells in a wireless communication system, the present invention includes receiving, from the user equipment, information on timing differences of signals received by the user equipment from a plurality of cells, defining a subframe for the user equipment according to the timing differences, and transmitting the data to the user equipment via the defined subframe.

6 Claims, 9 Drawing Sheets

METHOD OF TRANSMITTING AND RECEIVING DATA IN A WIRELESS COMMUNICATION SYSTEM

This application is the National Phase of PCT/KR2010/001550 filed on Mar. 12, 2010, which claims priority under 35 U.S.C. 119(e) to U.S. Provisional Application No. 61/159,806 filed on Mar. 13, 2009 and under 35 U.S.C. 119(a) to Patent Application No. KR 10-2009-0132982 filed in the Republic of Korea on Dec. 29, 2009 all of which are hereby expressly incorporated by reference into the present application.

TECHNICAL FIELD

The present invention relates to a wireless mobile communication system, and more particularly, to a method of transmitting data in a wireless communication system.

BACKGROUND ART

Generally, in case that a user equipment receives signals from a plurality of cells, misalignment of the signals received by the user equipment from a plurality of the cells may occur on time axis.

FIG. 1 is a diagram of signals received by a user equipment from two cells. Referring to FIG. 1, in case of OFDM based signal transmission and reception, a transmitting stage inserts a cyclic prefix in an OFDM symbol to prevent inter-symbol interference. In case that a plurality of cells are coordinated to transmit signals to one user equipment, even if discriminated signal waveforms are transmitted from a plurality of cells in a manner that cyclic prefixes overcome the misalignment of the signals of a plurality of the cells, the user equipment is able to successfully combine the signals received from a plurality of the cells.

FIG. 2 is a diagram for a case that a user equipment receives signals from 2 cells.

Referring to FIG. 2, in case that a user equipment receives signals from a cell A and a cell B, respectively, if a distance between the user equipment and the cell B is greater than that between the user equipment and the cell A, a propagation delay of the signal from the cell B is greater than that of the signal from the cell A.

Yet, when a user equipment receives signals from a plurality of cells, the user equipment is able to successfully decode the signals if the signals are almost simultaneously received by the user equipment from a plurality of the cells. In this case, the meaning of the almost simultaneous reception indicates that a timing difference between signals received from a plurality of cells should lie within a cyclic prefix.

FIG. 3 is a diagram for a case that a timing difference between signals received from a plurality of cells lies within a cyclic prefix.

Referring to FIG. 3, if a timing difference between a signal received from a cell A and a signal received from a cell B lies within a cyclic prefix, inter-symbol interference is not generated. Therefore, the signal from the cell A and the signal from the cell B can be errorlessly combined together.

FIG. 4 is a diagram for a case that a timing difference between signals received from a plurality of cells is greater than a cyclic prefix.

Referring to FIG. 4, if a timing difference between a signal received from a cell A and a signal received from a cell B is greater than a cyclic prefix, inter-symbol interference is generated from the signal received from the cell B because the signal of the cell B arrives after completion of the cyclic prefix of the signal of cell A. And, performance of system is degraded.

SUMMARY OF THE INVENTION

As mentioned in the foregoing description of the related art, system performance is degraded by inter-symbol interference attributed to timing differences of signals received from a plurality of cells.

Accordingly, the present invention is directed to a method of transmitting data in a wireless communication system that substantially obviates one or more of the problems due to limitations and disadvantages of the related art.

An object of the present invention is to provide a method of transmitting and receiving data in case that a user equipment receives signals from a plurality of cells, by which inter-symbol interference can be resolved.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method for transmitting data by a base station to a user equipment communicating with a plurality of cells in a wireless communication system, according to the present invention includes receiving, from the user equipment, information on timing differences of signals received by the user equipment from a plurality of the cells, defining a subframe for the user equipment according to the timing differences, and transmitting the data to the user equipment via the defined subframe.

Preferably, if a signal of the base station among the signals of a plurality of the cells arrives at the user equipment in the first place, the subframe does not use L OFDM symbols next to PDCCH, L is a smallest integer greater than a maximum value of the timing differences of the signals received from a plurality of the cells.

More preferably, the method further includes informing the user equipment of a location of an unused OFDM symbol in the subframe and the number of the OFDM symbols used in transmitting the data to the user equipment.

Preferably, if a signal of the base station among the signals of a plurality of the cells does not arrive at the user equipment in the first place, the subframe does not transmit the data during time duration of P next to PDCCH, P is defined as L minus the timing difference between the signal of the base station and a signal of another base station having its signal arrive at the user equipment in the first place, L is a smallest integer greater than a maximum value of the timing differences of the signals received from a plurality of the cells.

Preferably, if a signal of the base station among the signals of a plurality of the cells arrives at the user equipment latest, the subframe does not use last L OFDM symbols, L is a smallest integer greater than a maximum value of the timing differences of the signals received from a plurality of the cells.

Preferably, if a signal of the base station among the signals of a plurality of the cells does not arrive at the user equipment latest, the subframe does not transmit the data during the timing difference between the signal of the base station and a signal of another base station having its signal arrive at the user equipment latest next to PDCCH.

More preferably, the method further includes informing the user equipment of a delay value indicating how long the signal is delayed by the base station, if the base station is a serving cell.

To further achieve these and other advantages and in accordance with the purpose of the present invention, a method for receiving data in a user equipment communicating with a plurality of cells in a wireless communication system includes transmitting, to a plurality of the cells, information on timing differences of signals received from a plurality of the cells by the user equipment, and receiving the data via subframes defined for the user equipment by a plurality of the cells according to the timing differences, respectively.

Preferably, a first subframe defined by a base station having a signal arrive at the user equipment in the first place among a plurality of the cells does not use L OFDM symbols next to PDCCH, L is a smallest integer greater than a maximum value of the timing differences of the signals received from a plurality of the cells.

More preferably, the method further includes receiving a location of an unused OFDM symbol in the first subframe and the number of the OFDM symbols used in transmitting the data from the cell having the signal arrive at the user equipment in the first place.

Preferably, a second subframe defined by a base station having a signal not arrive at the user equipment in the first place among a plurality of the cells does not transmit the data during time duration of P next to PDCCH, P is defined as L minus the timing difference between the signal of the base station and a signal of another base station having its signal arrive at the user equipment in the first place, L is a smallest integer greater than a maximum value of the timing differences of the signals received from a plurality of the cells.

Preferably, a third subframe defined by a base station having a signal arrive at the user equipment latest among a plurality of the cells does not use last L OFDM symbols, L is a smallest integer greater than a maximum value of the timing differences of the signals received from a plurality of the cells.

Preferably, a fourth subframe defined by a base station having a signal not arrive at the user equipment latest among a plurality of the cells does not transmit the data during the timing difference between the signal of the cell having the signal not arrive at the user equipment latest and a signal of another base station having a signal arrive at the user equipment latest next to PDCCH.

It is to be understood that both the foregoing general description and the following detailed description are exemplary and explanatory and are intended to provide further explanation of the invention as claimed.

According to embodiments of the present invention, a base station transmits data to a user equipment in a manner of configuring a subframe using timing differences between signals of a plurality of cells communicating with a the user equipment. Therefore, the present invention resolves inter-symbol interference.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, they are applicable to other random mobile communication systems except unique features of 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS) and the like and that a base station is a common name of such a random node of a network stage communicating with a terminal as a node B, an eNode B, a base station and the like.

In the following description, a method of transmitting and receiving data according to an embodiment of the present invention is explained with reference to the accompanying drawings.

According to an embodiment of the present invention, a user equipment transmits timing differences of signals receives from a plurality of base stations. Subsequently, a plurality of the base stations delay their signal transmissions in consideration of the received timing differences, respectively.

Figure 1:
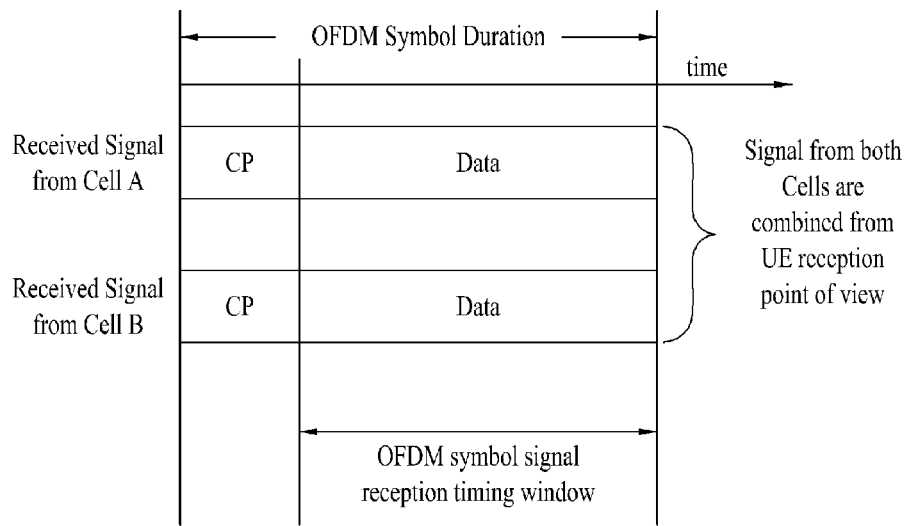
FIG. 1 is a diagram for a structure of a transmit unit in a data transmitting method according to a first embodiment of the present invention.
Figure 2:
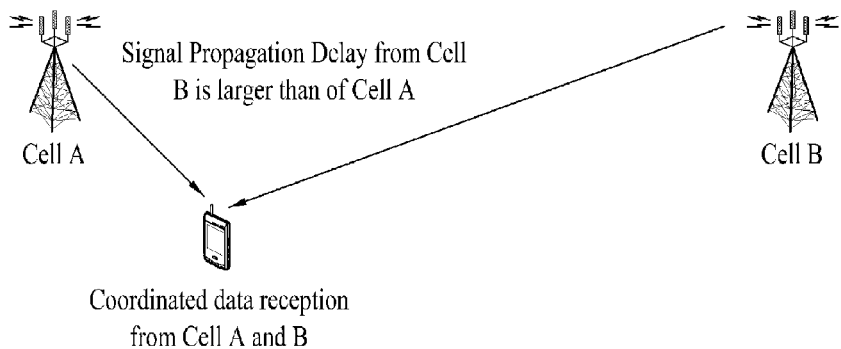
FIG. 2 is a diagram for a data transmitting method according to a second embodiment of the present invention.
Figure 3:
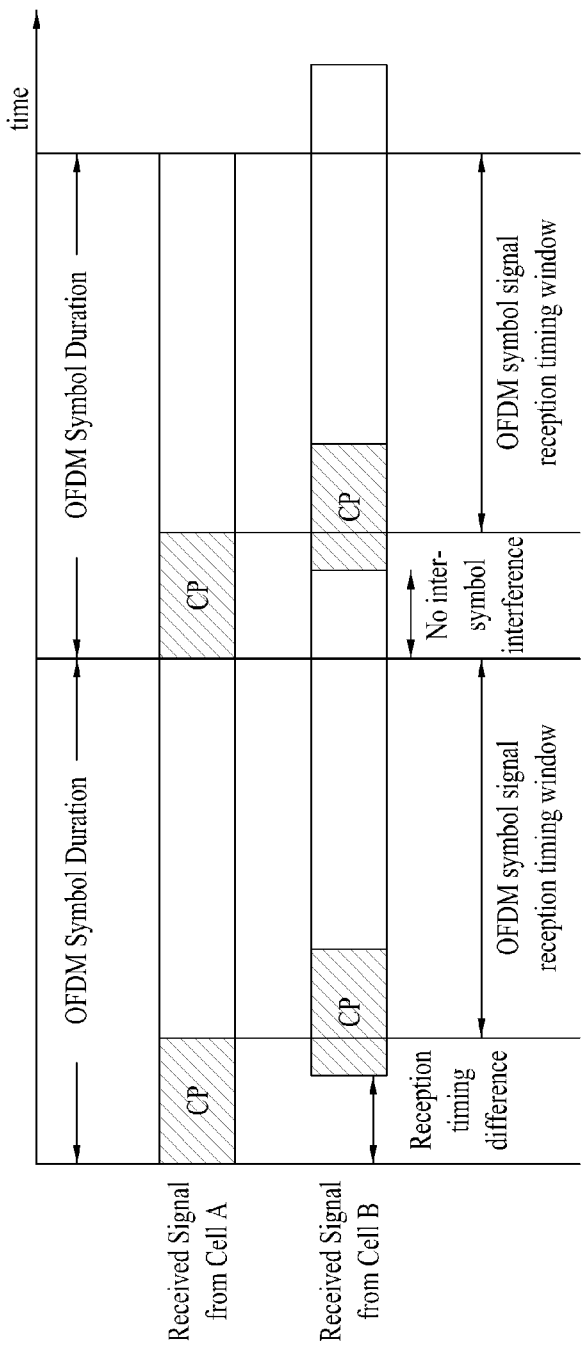
FIG. 3 is a diagram for a signal in time domain according to a second embodiment of the present invention.
Figure 4:
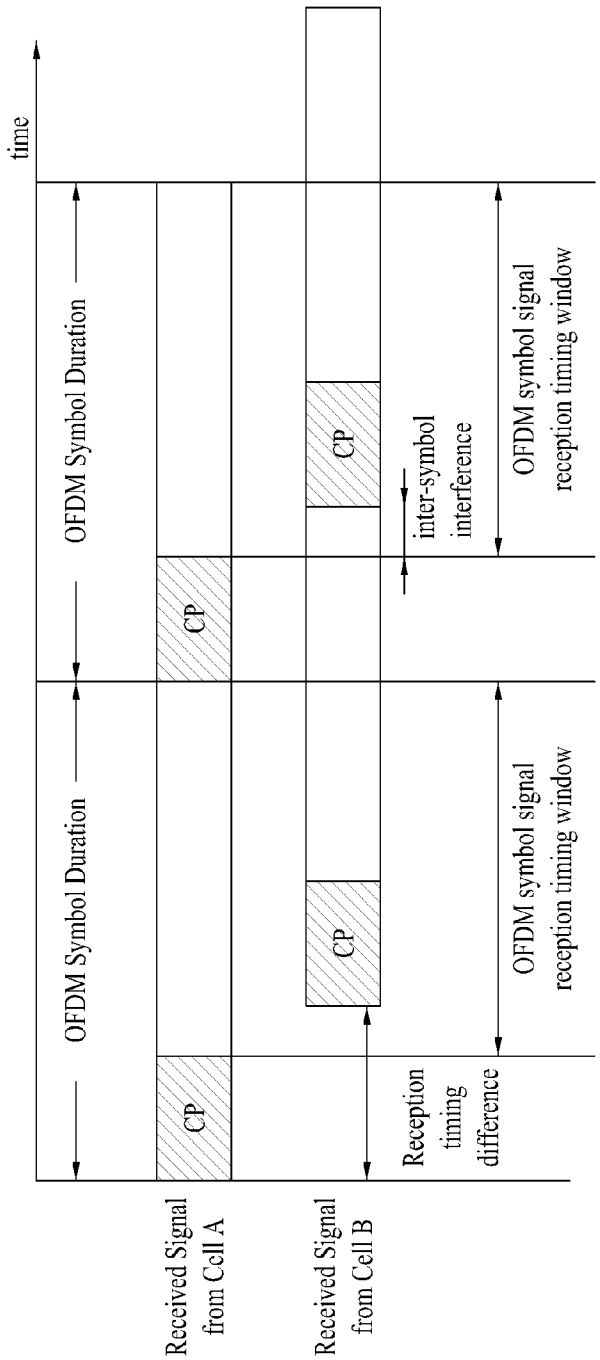
FIG. 4 is a diagram for a data allocating process according to a third embodiment of the present invention.
Figure 5:
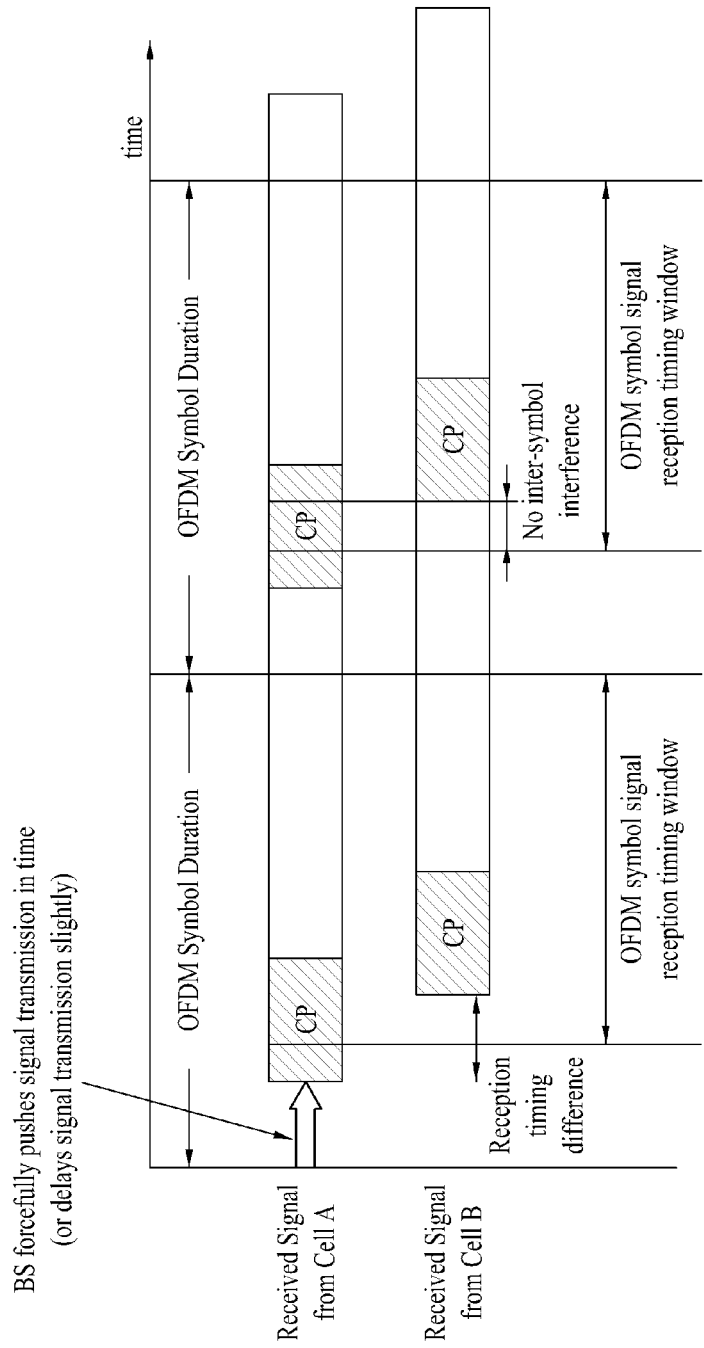
FIG. 5 is a diagram for a signal in time domain according to a third embodiment of the present invention.

FIG. 5 is a diagram for a basic concept of a data transmitting method according to an embodiment of the present invention. In particular, FIG. 5 shows a case that cell A delays and transmits the signal in the environment where a signal received from cell A and cell B are as shown in FIG. 4.

When the signal of the cell A arrives at the user equipment ahead of the signal of the cell B, as shown in FIG. 4, if a timing difference between the signal of the cell A and the signal of the cell B exceeds a cyclic prefix, inter-symbol interference is generated. Referring to FIG. 5, according to an embodiment of the present invention, if the user equipment transmits a timing difference between the signal of the cell A and the signal of the cell B to both of the cell A and the cell B, the cell A, of which signal arrives at the user equipment earlier than that of the cell B, delays its signal transmission so that the timing difference between the signal of the cell A and the signal of the cell B can become smaller than the cyclic prefix.

Referring to FIG. 5, as a timing difference between the signal of the cell A and the signal of the cell B, which are received by the user equipment, is smaller than the cyclic prefix, if a first OFDM symbol received from the cell B is overlapped with a cyclic prefix of a second OFDM symbol of the cell A, the inter-symbol interference is not generated.

Yet, if a base station delays the signal transmission, it affects other user equipments in the course of communicating with the base station receiving signals from a single cell. To solve this problem, it is able to define a subframe for a user equipment that receives signals from a plurality of cells. For example of this subframe, there is MBSFN subframe in LTE system.

Figure 6:
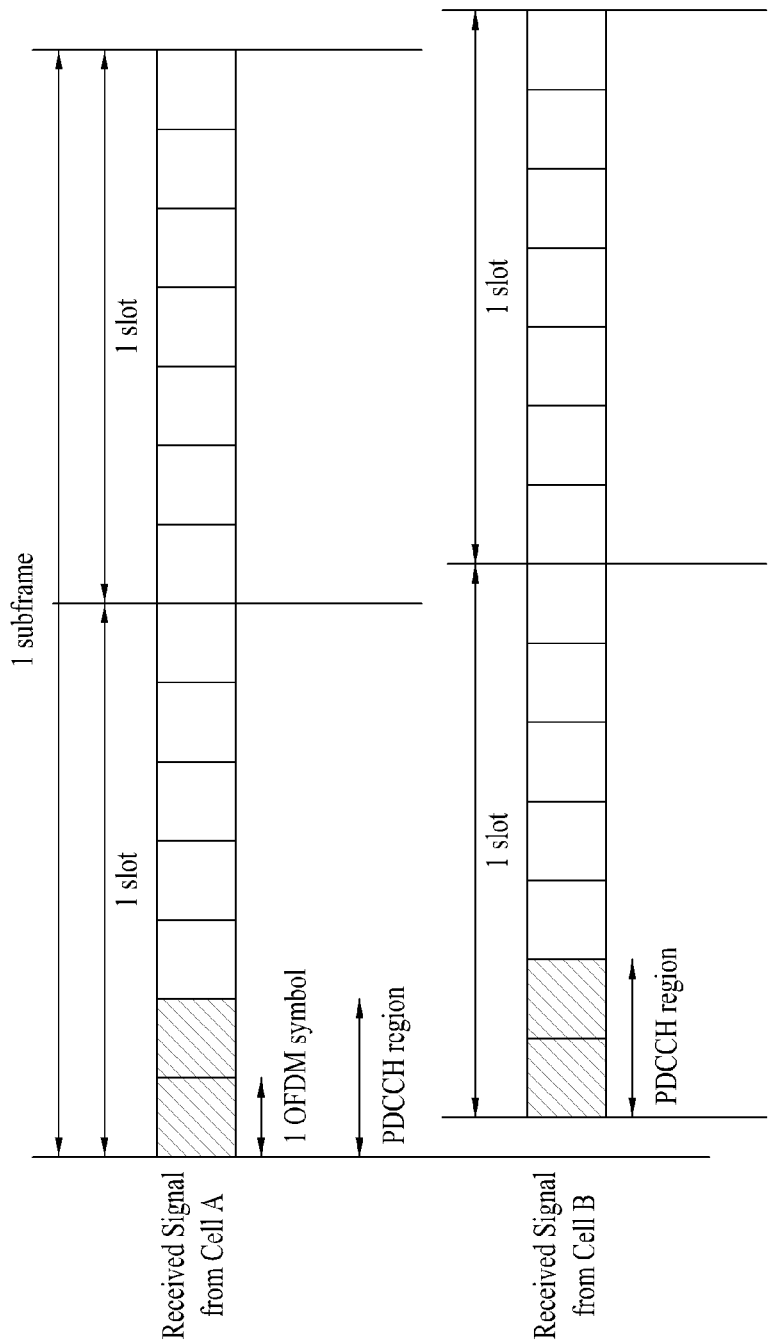
FIG. 6 is a diagram of a transmit unit according to a fourth embodiment of the present invention.

FIG. 6 shows an example for structures of subframes received from two cells by a user equipment, respectively. Referring to FIG. 6, 1 subframe includes 2 slots. And, each of the slots includes 7 OFDM symbols. And, FIG. 6 shows a case that a user equipment receives a signal from a cell A and then receives a signal from a cell B.

FIG. 6 shows a case that PDCCH region includes 2 OFDM symbols. Yet, a subframe structure can vary according to a configuration of a cyclic prefix and the number of OFDM symbols used for PDCCH. For example, the PDCCH region includes 1 OFDM symbol and the rest of the OFDM symbols are usable for data transmission.

In the following description, a data transmitting method according to a first embodiment of the present invention is explained with reference to FIG. 7.

Figure 7:
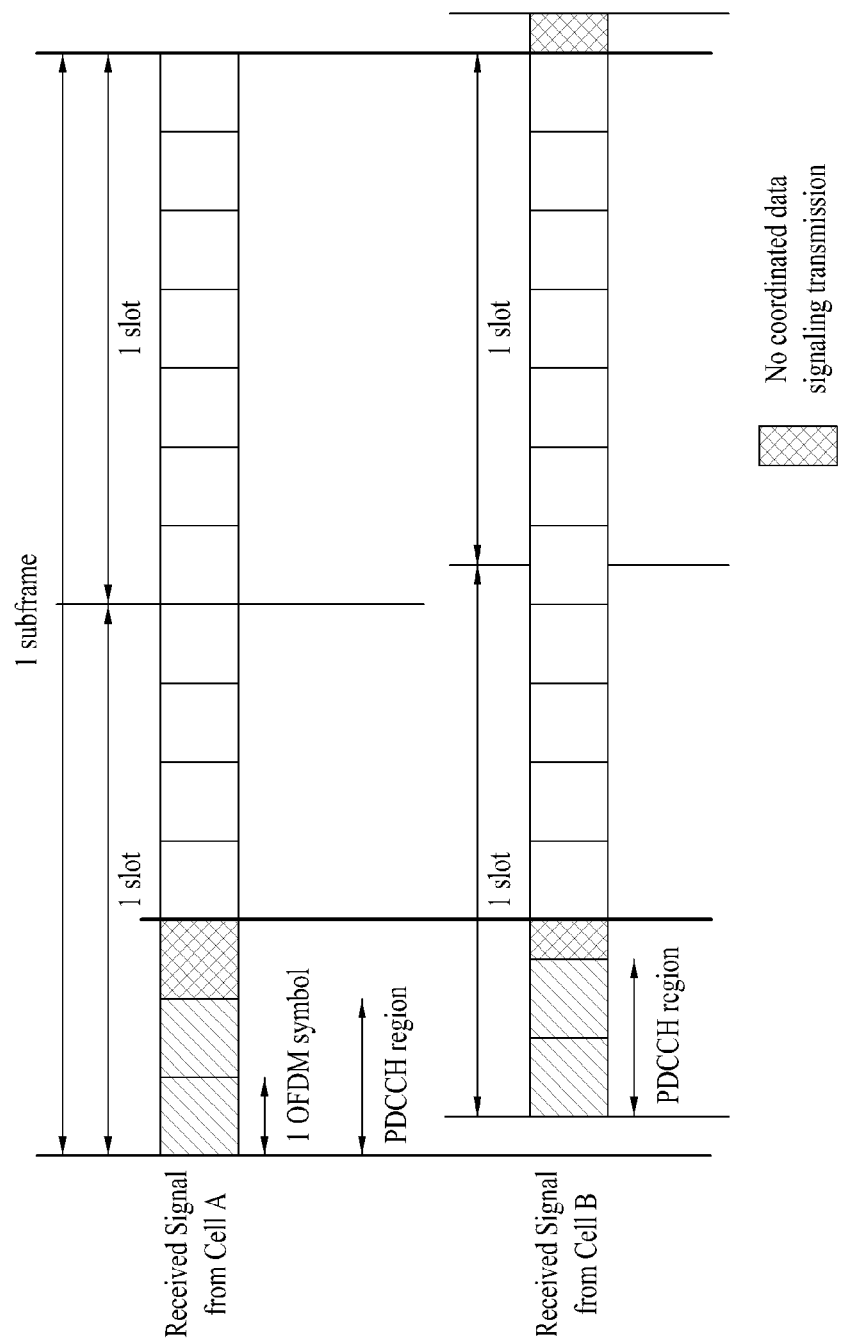
FIG. 7 is a diagram for configurations of mobile and base stations in which embodiments of the present invention are implemented.

FIG. 7 is a diagram for a data transmitting method according to a first embodiment of the present invention.

When a timing difference is represented by OFDM symbol unit, a smallest integer greater than a maximum timing difference of signals received from a plurality of cells is set to L. For instance, if a maximum timing difference of signals received from a plurality of cells is equal to or greater than 0 OFDM symbol and smaller than 1 OFDM symbol, the L is 1.

According to a first embodiment of the present invention, a base station having a signal arrive at a user equipment in the first place does not use L OFDM symbols right next to PDCCH but transmits data via OFDM symbols starting with (L+1)th OFDM symbol behind the PDCCH. Meanwhile, the rest of the base stations do not transmit data during time duration of P, where P is defined as (L—a timing difference between a signal of the corresponding base station and a signal of the base station having its signal arrive at the user equipment in the first place), and then start to transmit data.

FIG. 7 shows a case that a user equipment receives signals from two cells. In FIG. 7, as a timing difference between a signal received from a cell A and a signal received from a cell B is smaller than 1 OFDM symbol, L becomes 1. Therefore, the cell A having its signal arrive at the user equipment in the first place does not use 1 OFDM next to PDCCH but transmits data via OFDMs starting with 2nd OFDM behind the PDCCH.

The cell B does not transmit data during time duration of P, where P is defined as (L—a timing difference from a signal of the base station having its signal arrive at the user equipment in the first place) next to the PDCCH, and then starts to transmit data. In this case, referring to FIG. 7, the cell B newly defines OFDM symbol after time duration of P (L—a timing difference from a signal of the base station having its signal arrive at the user equipment in the first place) to match OFDM symbol boundary with the cell A.

Since the cell A does not change the boundary of OFDM symbol, a transmit timing of a CoMP subframe is equal to that of a non-CoMP subframe. Namely, the cell A is able to transmit data in a manner of performing FDM (frequency division multiplexing) on the data transmitted to a CoMP user equipment and the data transmitted to a non-CoMP user equipment. In doing so, when the cell A transmits data to the non-CoMP user equipment, the cell A uses OFDM symbols starting with the OFDM symbol right next to PDCCH.

Yet, since the cell B has newly defined the OFDM symbol boundary of the CoMP subframe, a transmit timing of a CoMP subframe is different from that of a non-CoMP subframe. Therefore, the cell B is able to transmit data in a manner of performing TDM (time division multiplexing) on the data transmitted to a CoMP user equipment and the data transmitted to a non-CoMP user equipment.

A user equipment is synchronized with a serving base station. And, according to a first embodiment of the present invention a plurality of cells transmit signals to fit an OFDM symbol boundary of a base station having its signal arrive at the user equipment in the first place. Therefore, if the base station having its signal arrive at the user equipment in the first place is a serving base station, the user equipment is able to normally receive signals.

If the base station having its signal arrive at the user equipment in the first place is a serving base station, the serving base station has to inform the user equipment of the number of OFDM symbols used for CoMP data transmission and a location of unused OFDM symbol. For instance, if the cell A in FIG. 7 is a serving base station, the cell A should inform the user equipment that an OFDM next to PDCCH is not used and that 11 OFDM symbols are used for CoMP data transmission. If so, the user equipment does not decode the OFDM symbol next to the PDCCH and then decodes the 11 OFDM symbols next to the former OFDM symbol.

In the following description, a data transmitting method according to a second embodiment of the present invention is explained with reference to FIG. 8.

Figure 8:
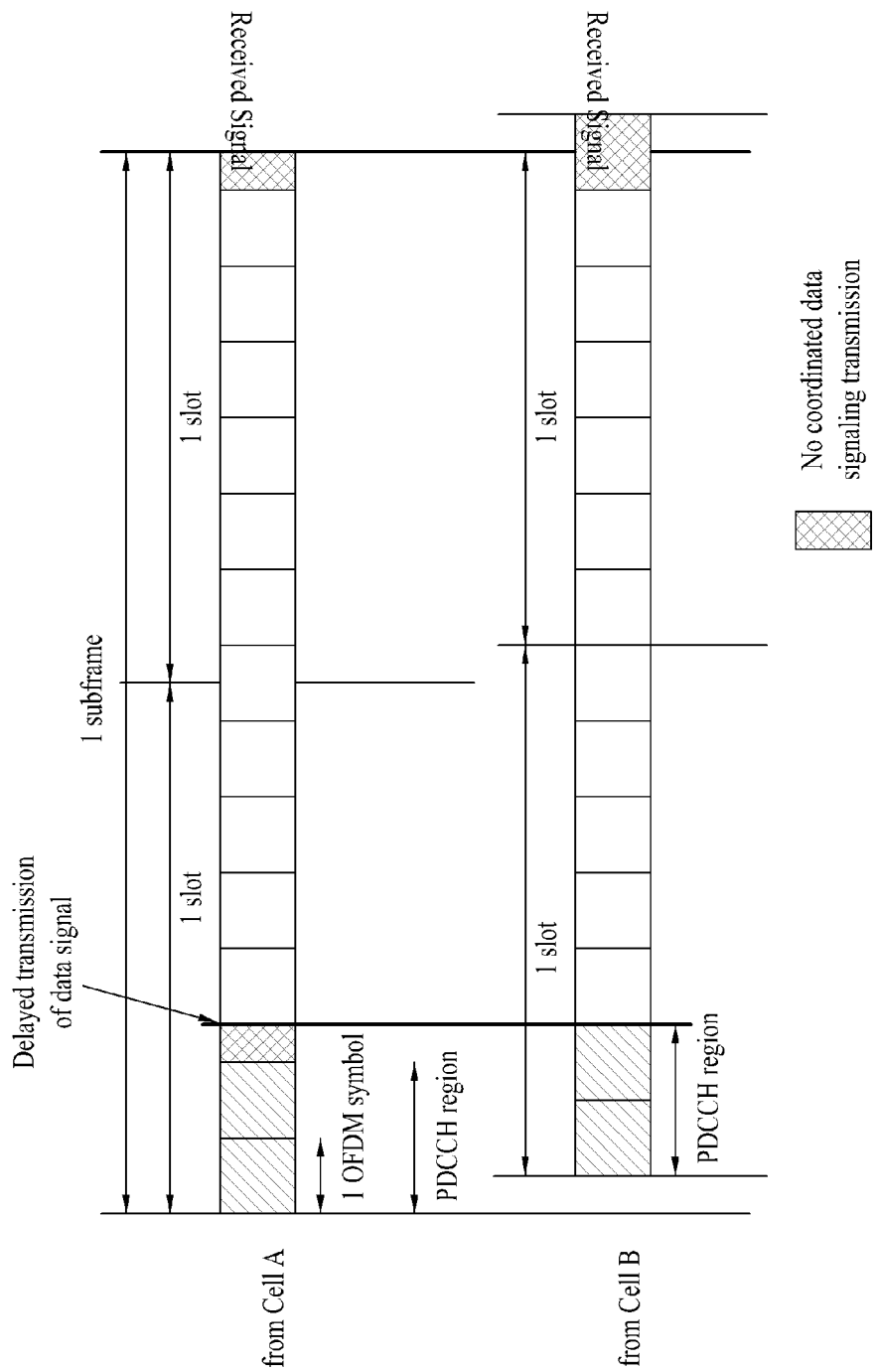
FIG. 8 is a diagram for a data transmitting method according to a second embodiment of the present invention.

FIG. 8 is a diagram for a data transmitting method according to a second embodiment of the present invention.

According to a second embodiment of the present invention, a plurality of cells transmitting signals to a user equipment do not transmit data during a timing difference from the cell having its signal arrive at the user equipment latest. When a timing difference is represented by OFDM symbol unit, if a smallest integer greater than a maximum timing difference of signals received from a plurality of the cells is set to L, the cell having its signal arrive at the user equipment latest does not use last L OFDM symbols of a subframe.

FIG. 8 shows a case that a user equipment receives signals from two cells. In FIG. 8, a cell A does not transmit data during a timing difference from a cell B next to PDCCH and then starts to transmit data. In this case, referring to FIG. 8, the cell A newly defines OFDM symbol after the timing difference from the cell B to match OFDM symbol boundary with the cell B.

In FIG. 8, as a timing difference between the signal of the cell A and the signal of the cell B is smaller than 1 OFDM symbol, the cell B does not use the last 1 OFDM symbol.

According to the second embodiment of the present invention, since the cell B does not change the boundary of OFDM symbol, a transmit timing of a CoMP subframe is equal to that of a non-CoMP subframe. Namely, the cell B is able to transmit data in a manner of performing FDM (frequency division multiplexing) on the data transmitted to a CoMP user equipment and the data transmitted to a non-CoMP user equipment. In doing so, when the cell B transmits data to the non-CoMP user equipment, the cell B uses the last OFDM symbol as well.

Yet, since the cell A has newly defined the OFDM symbol boundary of the CoMP subframe, a transmit timing of a CoMP subframe is different from that of a non-CoMP subframe. Therefore, the cell A is able to transmit data in a manner of performing TDM (time division multiplexing) on the data transmitted to a CoMP user equipment and the data transmitted to a non-CoMP user equipment.

In FIG. 8, if the cell A is a serving base station, the cell A should inform the user equipment of a delay value indicating how long a signal is delayed and transmitted. Since the user equipment is synchronized with the serving cell, in case that the serving cell delays and transmits a signal, the user equipment has to inform the user equipment of the delay. Therefore, the user equipment is able to decode the signal to fit the timing.

In the following description, a data transmitting method according to a third embodiment of the present invention is explained with reference to FIG. 9.

Figure 9:
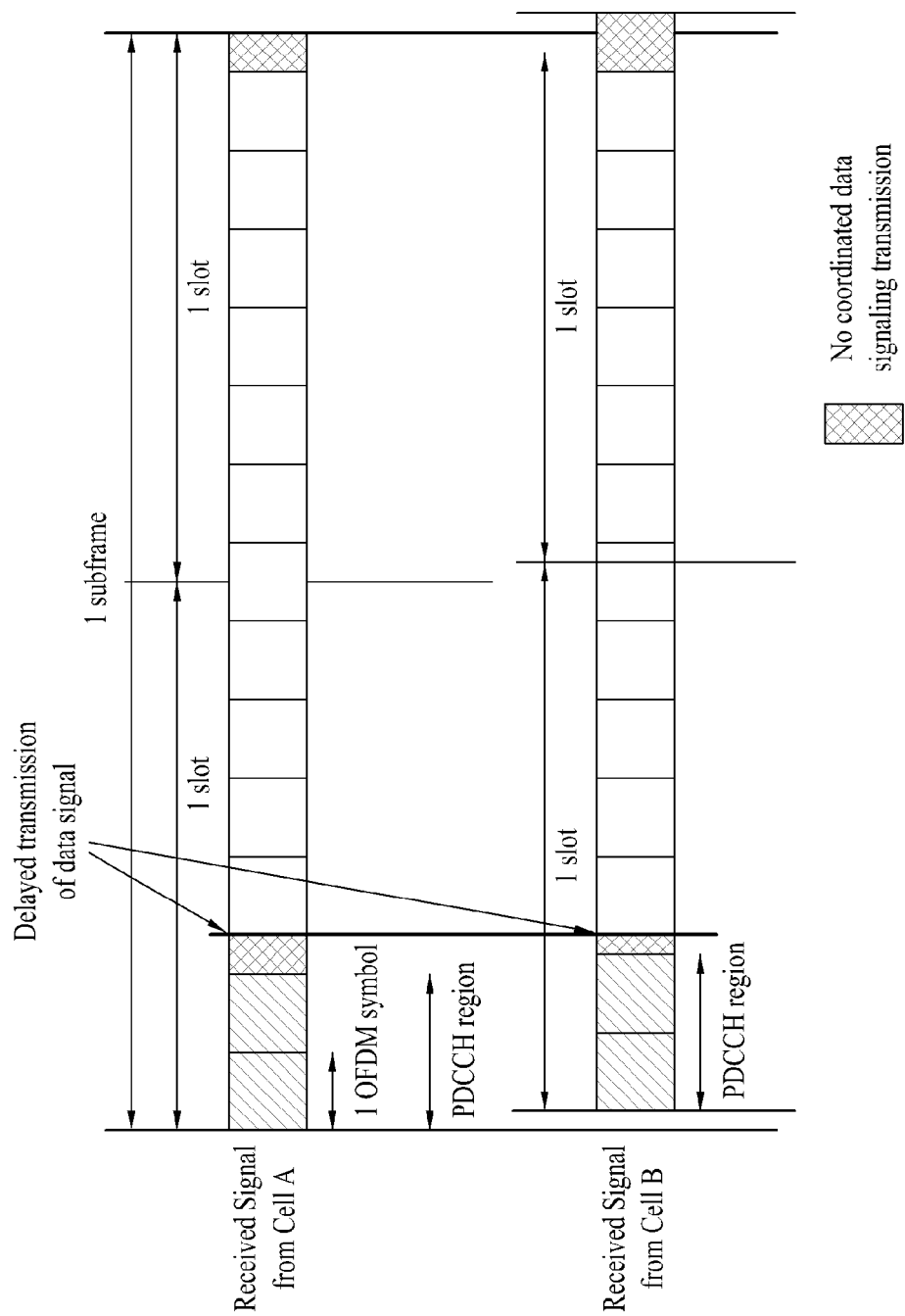
FIG. 9 is a diagram for a data transmitting method according to a third embodiment of the present invention.

FIG. 9 is a diagram for a data transmitting method according to a third embodiment of the present invention.

According to a third embodiment of the present invention, a plurality of cells transmitting signals to a user equipment determine the number of OFDM symbols, which will be used in transmitting signals to the user equipment, and then transmit data by delaying the signals.

FIG. 9 shows a case that a user equipment receive data from two cells. Referring to FIG. 9, both cell A and cell B transmit data by delaying a signal. In particular, all cells, which transmit signals to a user equipment, delay signals, defining OFDM symbol to match OFDM boundary, and then transmit data.

In doing so, a serving cell should inform the user equipment of a delay value indicating how much the signal is delayed by the serving cell.

Figure 10:
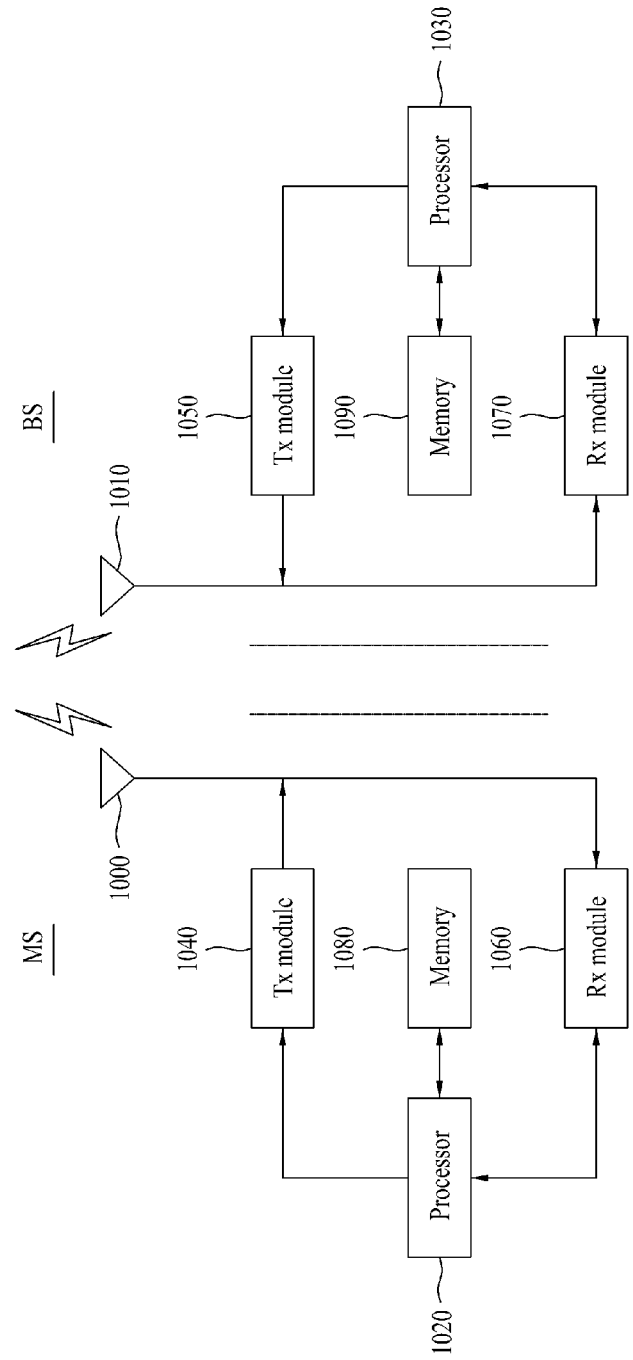
FIG. 10 is a diagram for configurations of mobile and base stations, in which embodiments of the present invention are implemented, according to another embodiment of the present invention.

FIG. 10 is a diagram for configurations of mobile and base stations, in which embodiments of the present invention are implemented, according to another embodiment of the present invention.

Referring to FIG. 10, a mobile station (AMS)/base station (ABS) includes an antenna 1000/1010 capable of transmitting and receiving information, data, signals and/or messages and the like, a transmitting module (Tx module) 1040/1050 transmitting a message by controlling the antenna, a receiving module (Rx module) 1060/1070 receiving a message by controlling the antenna, a memory 1080/1090 storing informations associated with communication with a base station, and a processor 1020/1030 controlling the transmitting module, the receiving module and the memory. In this case, the base station can include a femto base station or a macro base station.

The antenna 1000/1010 externally transmits a signal generated from the transmitting module 1040/1050. And, the antenna 1000/1010 receives a radio signal from outside and then delivers the received radio signal to the receiving module 1060/1070. In case that a multiple-antenna (MIMO) function is supported, at least two antennas can be provided to the mobile station or the base station.

The processor 1020/1030 generally controls overall operations of the mobile/base station. In particular, the processor 1020/1030 is able to perform a control function for performing the above-described embodiments of the present invention, a MAC (medium access control) frame variable control function according to service characteristics and propagation environment, a handover function, an authentication function, an encryption function and the like. And, the processor 1020/1030 can further include an encryption module configured to encrypt various messages and a timer module configured to control transmission and reception of the various messages.

The transmitting module 1040/1050 performs prescribed coding and modulation on a signal and/or data, which is scheduled by the processor and will be then transmitted externally, and is then able to deliver the coded and modulated signal and/or data to the antenna 1000/1010.

The receiving module 1060/1070 reconstructs the radio signal received externally via the antenna 1000/1010 into original data in a manner of performing decoding and demodulation on the received radio signal and is then able to deliver the reconstructed original data to the processor 1020/1030.

The memory 1080/1090 can store programs for processing and control of the processor and is able to perform a function of temporarily storing input/output data (e.g., in case of the mobile station, UL grant allocated by the base station, system information, station identifier (STID), a flow identifier (FID), an action time, region allocation information, frame offset information, etc.).

And, the memory 1080/1090 can include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

According to embodiments of the present invention, a base station transmits data to a user equipment in a manner of configuring a subframe using timing differences between signals of a plurality of cells communicating with a the user equipment. Therefore, the present invention resolves inter-symbol interference.

The invention claimed is:

1. A method for transmitting data by a base station to a user equipment communicating with a plurality of cells in a wireless communication system, the method comprising:
   receiving, from the user equipment, information on timing differences of signals received by the user equipment from a plurality of the cells;
   defining a subframe for the user equipment according to the timing differences; and
   transmitting the data to the user equipment via the defined subframe,
   wherein, if a signal of the base station among the signals of the plurality of the cells arrives at the user equipment in the first place, the subframe does not use L OFDM symbols next to PDCCH, and
   wherein L is a smallest integer greater than a maximum value of the timing differences of the signals received from the plurality of the cells.

2. The method of claim 1, further comprising:
   informing the user equipment of a location of an unused OFDM symbol in the subframe and the number of the OFDM symbols used in transmitting the data to the user equipment.

3. A method for transmitting data by a base station to a user equipment communicating with a plurality of cells in a wireless communication system, the method comprising:
   receiving, from the user equipment, information on timing differences of signals received by the user equipment from the plurality of the cells;
   defining a subframe for the user equipment according to the timing differences; and
   transmitting the data to the user equipment via the defined subframe,
   wherein, if a signal of the base station among the signals of the plurality of the cells does not arrive at the user equipment in the first place, the subframe does not transmit the data during time duration of P next to PDCCH,
   wherein P is defined as L minus the timing difference between the signal of the base station and a signal of another base station having its signal arrive at the user equipment in the first place, and
   wherein L is a smallest integer greater than a maximum value of the timing differences of the signals received from the plurality of the cells.

4. A method for receiving data in a user equipment communicating with a plurality of cells in a wireless communication system, the method comprising:
   transmitting, to the plurality of the cells, information on timing differences of signals received from the plurality of the cells by the user equipment; and
   receiving the data via subframes defined for the user equipment by the plurality of the cells according to the timing differences, respectively,
   wherein a first subframe defined by a base station having a signal arrive at the user equipment in the first place among the plurality of the cells does not use L OFDM symbos next to PDCCH, and
   wherein L is a smallest integer greater than a maximum value of the timing differences of the signals received from the plurality of the cells.

5. The method of claim 4, further comprising:
   receiving a location of an unused OFDM symbol in the first subframe and the number of the OFDM symbols used in transmitting the data from the cell having the signal arrive at the user equipment in the first place.

6. The method of claim 4 wherein a second subframe defined by a base station having a signal not arrive at the user equipment in the first place among the plurality of the cells does not transmit the data during time duration of P next to PDCCH, and
   wherein P is defined as L minus the timing difference between the signal of the base station and a signal of another base station having its signal arrive at the user equipment in the first place.

* * * * *